United States Patent [19]
Bales et al.

[11] Patent Number: 5,729,532
[45] Date of Patent: Mar. 17, 1998

[54] SELECTIVE PARTICIPATION IN A MULTIMEDIA COMMUNICATION CONFERENCE CALL

[75] Inventors: Bruce Merrill Bales, Louisville; Stephen Max Thieler, Boulder, both of Colo.

[73] Assignee: Lucent Technologies Inc., Murray Hill, N.J.

[21] Appl. No.: 451,297

[22] Filed: May 26, 1995

[51] Int. Cl.$^6$ .................................................. H04J 3/12
[52] U.S. Cl. ..................... 370/261; 370/468; 370/522; 379/204
[58] Field of Search .................... 370/62, 84, 60, 370/60.1, 110.1, 79, 80, 260, 261, 262, 263, 264, 265, 266, 267, 268, 269, 433, 464, 465, 468, 545, 436, 522, 85.7, 95.1, 68.1; 379/202, 203, 204, 205, 206; 348/14, 15

[56] References Cited

U.S. PATENT DOCUMENTS

| | | |
|---|---|---|
| 4,796,293 | 1/1989 | Blinken et al. . |
| 4,953,159 | 8/1990 | Hayden et al. .................... 348/15 |
| 5,182,751 | 1/1993 | Bales et al. . |
| 5,195,086 | 3/1993 | Baumgartner et al. . |
| 5,258,979 | 11/1993 | Oomuro et al. .................... 370/80 |
| 5,371,534 | 12/1994 | Dagdeviren et al. ............... 348/14 |
| 5,428,608 | 6/1995 | Freeman et al. ................... 370/62 |
| 5,463,629 | 10/1995 | Ko ................................... 370/110.1 |
| 5,473,363 | 12/1995 | Ng et al. ............................ 348/15 |
| 5,477,542 | 12/1995 | Takahara et al. ................... 370/79 |
| 5,495,285 | 2/1996 | Fujioka ............................. 379/202 |
| 5,515,511 | 5/1996 | Nguyen et al. ................... 370/85.7 |

OTHER PUBLICATIONS

International Telecommunication Union (ITU-T, Telecommunication Standardization Sector of ITU, H.320, (Mar. 1993), Recommendation H.320, pp. 1–12.

*Primary Examiner*—Wellington Chin
*Assistant Examiner*—Huy D. Vu
*Attorney, Agent, or Firm*—John C. Moran

[57] ABSTRACT

Continuously varying the type of media used during a multimedia communication conference call by a telecommunications terminal. In response to inputs from a user, a telecommunication terminal can vary the type of media by increasing, decreasing, or changing the bandwidth of the call. Further, a telecommunication terminal controlling the multimedia communication conference call is informed of changes being made by the telecommunication terminal on the conference call and informs the remaining telecommunication terminals of changes in participation of the telecommunication terminal.

10 Claims, 13 Drawing Sheets

TRANS 300 (TRANSPORT MESSAGE)

TRANS_ACK 310 (TRANSPORT ACKNOWLEDGE)

TRANS_COM 320 (TRANSPORT COMPLETE MESSAGE)

TRANS_REJ 330 (TRANSPORT REJECT MESSAGE)

FIG. 11
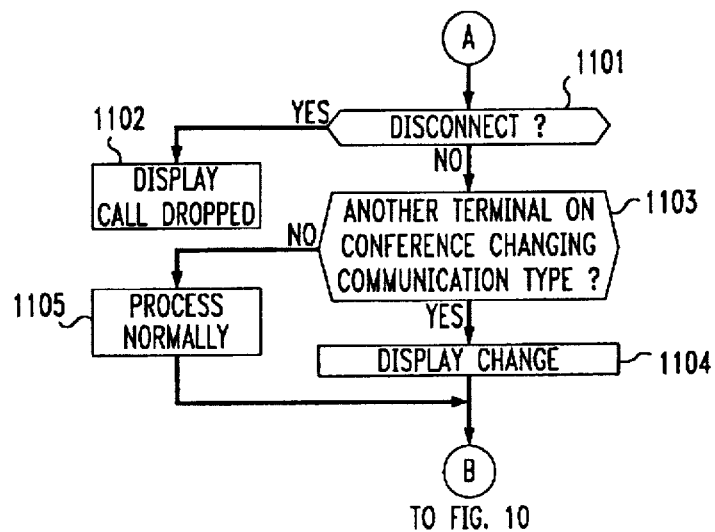
FIG. 12
| CONFERENCE TABLE | | |
|---|---|---|
| ID | ADDRESS | TYPE OF MEDIA |
| 0 | 101* | VI, VO, HD |
| 1 | 104 | VI, VO, HD |
| 2 | 106 | HD |
FIG. 16
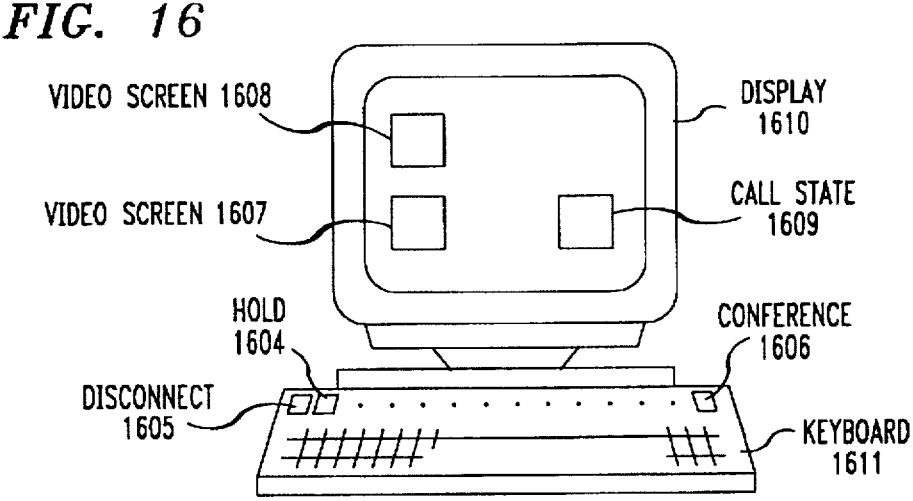

SELECTIVE PARTICIPATION IN A MULTIMEDIA COMMUNICATION CONFERENCE CALL

CROSS-REFERENCE TO RELATED APPLICATIONS

B. M. Bales and S. M. Thieler, Case 26–19, "Adjustment Of Call Bandwidth During A Communication Call" Ser. No. 08/451,282, filed May 26, 1995;

B. M. Bales and S. M. Thieler, Case 30–21, "Variable Communication Bandwidth For Providing Automatic Call Back And Call Hold", Ser. No. 08/451,296, filed May 26, 1995;

B. M. Bales and S. M. Thieler, Case 31–22, "Variable Communication Bandwidth For Conference Call Initiation", Ser. No. 08/452,458, filed May 26, 1995; and B. M. Bales and S. M. Thieler, Case 34–24, "Multimedia Conference Call Providing Adjustable Bandwidth For Individual Communication Terminals", Ser. No. 08/452,484, filed May 26, 1995.

These applications are filed concurrently with this application and are assigned to the same assignee.

TECHNICAL FIELD

This invention relates to telecommunication multimedia conference calls and, in particular, to the type of media used by each party in the telecommunication multimedia conference call.

BACKGROUND OF THE INVENTION

With the advent of multimedia communication conference calls, the need for a group of individuals to gather at one point for a conference has been greatly reduced. The cost of multimedia communication conferences is high due to the cost of transmitting the information from point to point. Because of the advantages gained by the use of multimedia presentations, users of the multimedia conference calls are willing to pay the cost of such conference calls. However, there is a need to reduce that cost whenever possible. During a multimedia communication conference call involving a large number of people, each located at an individual site, not all of the individuals need or desire to receive every form of media that is being used except at particular times during the conference call. For example, an individual may only be interested in a particular portion of the conference and only needs to monitor when that portion of the conference occurs.

There exists a need then for participants in a multimedia communication conference call to utilize only the amount of the media that is necessary for their participation at each particular point in the multimedia communication conference call.

SUMMARY OF THE INVENTION

The foregoing problem is solved and a technical advance is achieved by a telecommunications terminal that can continuously vary the type of media it receives during a multimedia communication conference call. In response to inputs from a user, the telecommunication terminal can vary the type of media by increasing, decreasing, or changing the bandwidth of the call. Further, a telecommunication terminal controlling the multimedia communication conference call is informed of changes being made by the telecommunication terminal on the conference call and informs remaining telecommunication terminals of the changes in participation of the telecommunication terminal.

BRIEF DESCRIPTION OF THE DRAWING

FIGS. 10 and 11 illustrate, in flow chart form, operations performed by a participating communication terminal in a multimedia communication conference call;

FIG. 12 illustrates a conference table;

FIG. 16 illustrates a communication terminal.

DETAILED DESCRIPTION

Figure 1:
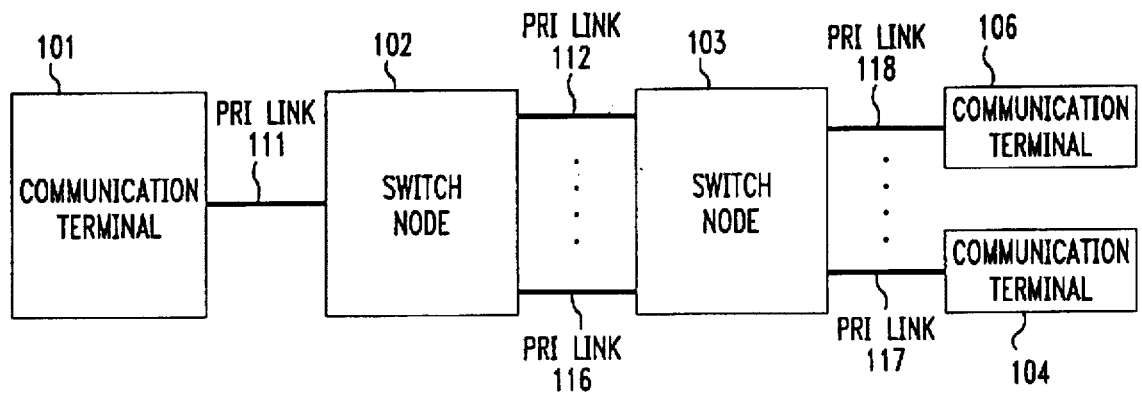
FIG. 1 illustrates a system for implementing the inventive concepts.

FIG. 1 illustrates a system for implementing the invention. Each of the communication terminals is connected to a switch node via a PRI link. Switch nodes 102 and 103 are interconnected by PRI links 112 through 116. One skilled in the art could readily see that there could be additional switch nodes also interconnected by PRI links or other communication links. One skilled in the art could also readily see that similar functions could be performed for the communication terminals if the PRI links were BRI links and video and data compression were utilized. Further information on the operation and software structure of switch nodes is given in U.S. Pat. No. 5,386,466, entitled "Automatic Initialization of a Distributed Telecommunications System. U.S. Pat. No. 5,386,466, is hereby incorporated by reference. A switch node with a video network is described in U.S. patent application Ser. No. 08/085,997U.S. Pat. No. 5,473,367, entitled "Video View Selection by a Chairperson", filed Jun. 30, 1993, and assigned to the same assignee as the present application. U.S. patent application Ser. No. 08/085,997 is hereby incorporated by reference.

To understand how the system of FIG. 1 operates, consider the following example. In this example, communication terminal 101 is controlling a multimedia conference call set up between communication terminals 101, 104, and 106. Communication terminal 101 controlled the set up of this conference by the transmission of ISDN messages to switch node 102. The multimedia conference consists of video, voice, and high speed data communication transport with the high speed data being utilized for the projection of view graphs. The video, voice, and high-speed data are also referred to as participation functions. During the multimedia communication conference call, the user of communication terminal 104 wishes only to monitor the presentation of the view graphs without the accompanying voice and video so as to reduce the cost of the multimedia communication conference call. In the conference call, the video is being used to display the participants in the call. To accomplish this, communication terminal 104 transmits a transport (TRANS) message to communication terminal 101 via switch nodes 103 and 102. The message designates that the video and voice communication is to be removed with respect to communication terminal 104. Switch nodes 103 and 102 are responsive to the transport message to remove the video and voice communication from the call path (also referred to as the call branch) of the multimedia conference call that extends from communication 101 to communication 104 via switch nodes 102 and 103. Communication terminal 101 is responsive to the transport message to transmit a transport complete (TRANS_COM) to communication terminal 104 confirming the reduction of communication. In addition, communication terminal 101 transmits to communication terminal 106 the fact that communication 104 is only receiving high speed data communication. Advantageously, both communication terminals 101 and 106 display the fact that communication terminal 104 is only receiving high speed data to their respective users.

At a later point in time, the user of communication terminal 104 wishes to receive video, voice, and high speed data communication of the multimedia conference call and instructs communication terminal 104 of this fact. The user may have decided to restart full participation in the conference because of a view graph that the user saw displayed. Communication terminal 104 is responsive to the user to transmit a transport message that defines that video and voice are to be added to the branch of the conference call that is directed to communication terminal 104. Switch nodes 102 and 103 are responsive to this transport message to automatically include communication terminal 104 in full participation of the multimedia conference call. Communication terminal 101 is responsive to the message to reply with a transport complete message. In addition, communication terminal 101 transmits a message to communication terminal 106 advising communication terminal 106 of the fact that communication terminal 104 is now fully participating in the conference call. Both communication terminals 101 and 106 inform their respective users of this fact.

Consider the following two examples to help in the understanding of the operation of the switch nodes and communication terminals illustrated in FIG. 1 with respect to the new transport messages. These examples are based on a call between two communication terminals to illustrate the operation of the new transport messages in the simplest case. The operation of these messages for conference calls is discussed in detail with respect to FIGS. 10 through 15. Assume that communication terminal 101 originates a logical call to communication terminal 104. As is well known in the ISDN signalling protocol, a set up message is first transmitted from communication terminal 101 to communication terminal 104 via switch nodes 102 and 103. Each switch node is responsive to the set up message to establish the necessary call information. Upon receipt of the set up message, communication terminal 104 alerts its user and sends back to communication terminal 101 an alerting message. When the user answers the call, communication terminal 104 transmits to switch node 103 a connect message. Upon receipt of the connect message, switch node 103 establishes a logical path and transmits a connect message to switch node 102 which also establishes a logical path. When the connect message is received by communication terminal 101, it is communicated via logical path that has been established through switch nodes 102 and 103.

Figure 2:
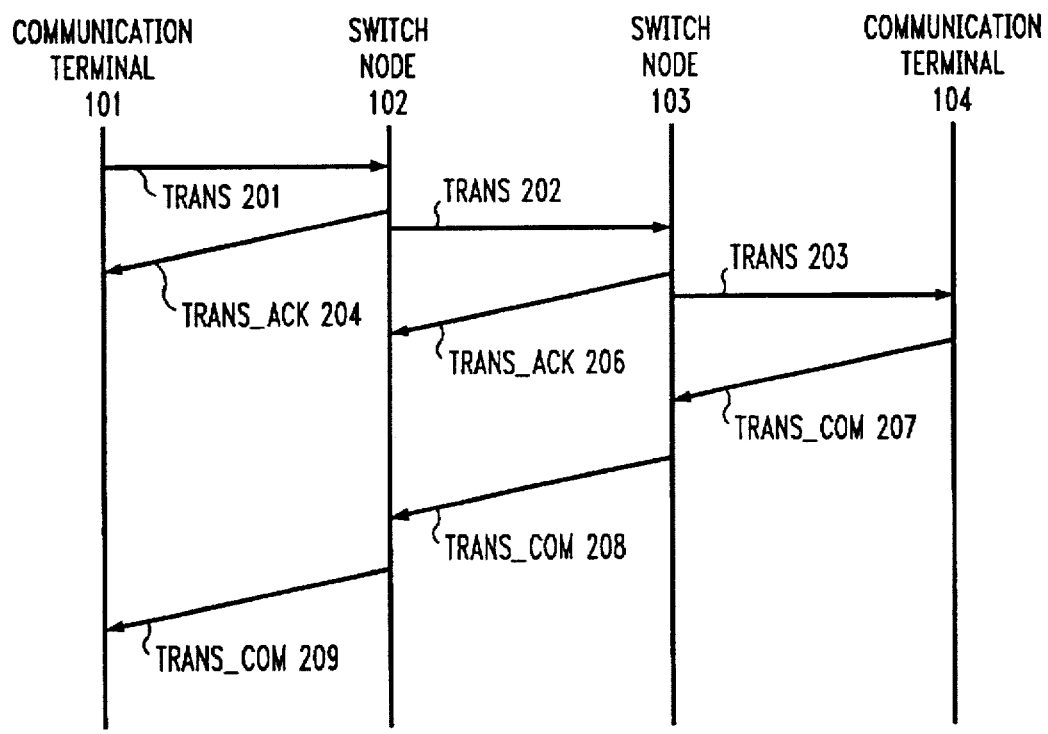
FIG. 2 illustrates the message flow embodied in the inventive concept.
Figure 3A:
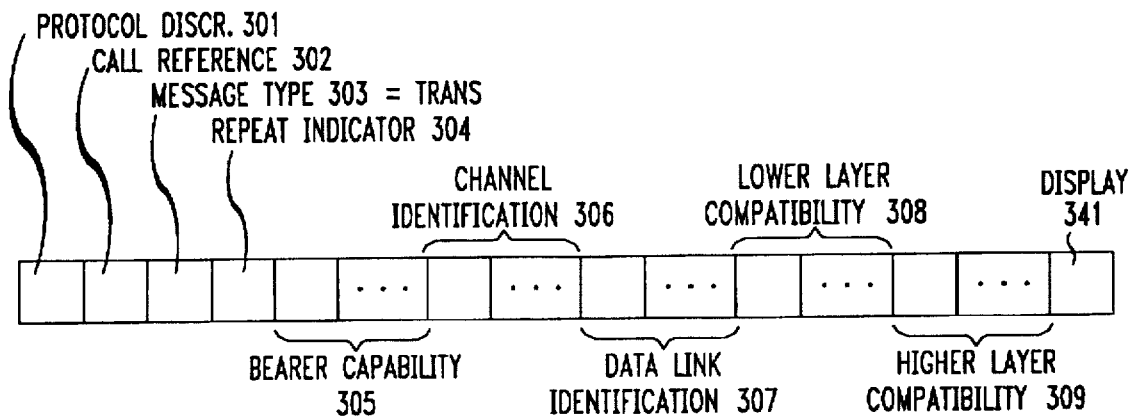
FIG. 3 illustrates the messages utilized to implement the inventive concept.
Figure 3B:
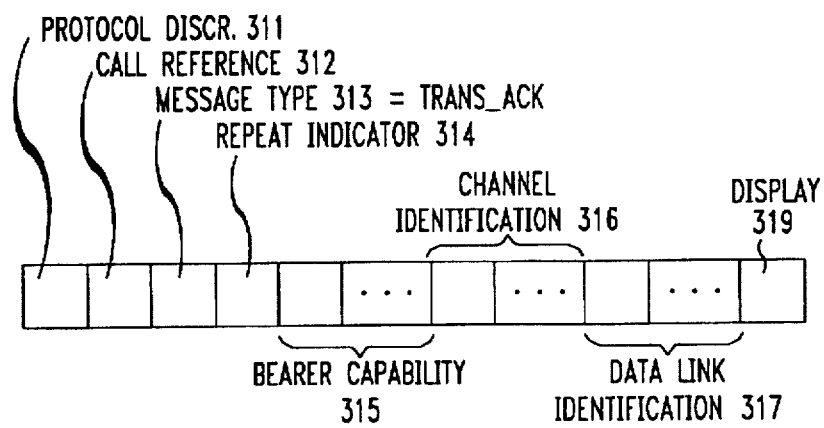
Figure 3C:
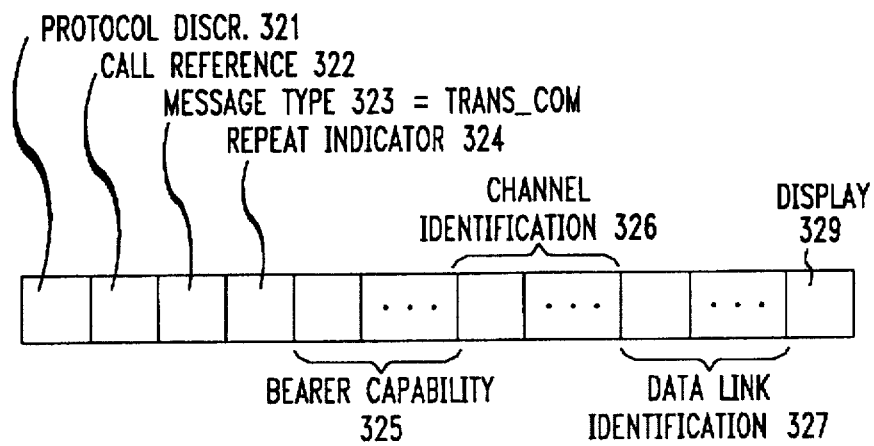
Figure 3D:
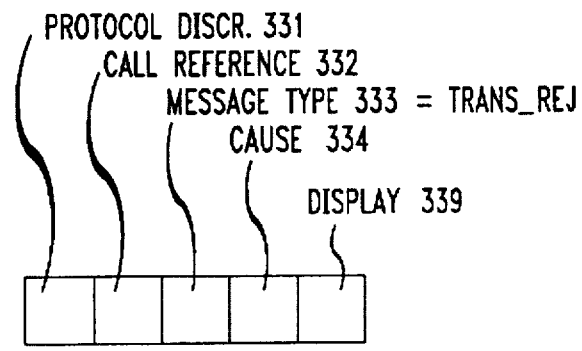

At a subsequent time, the users of communication terminals 101 and 104 desire a video capability so that they can exchange video images. To add video capability to the call, communication terminal 101 transmits TRANS 201 (transport) message as illustrated in FIG. 2 to switch node 102. TRANS 201 message requests that a video capability be added to the call. (The actual contents of the message will be discussed in greater detail later.) If switch node 102 can provide the video capability, it transmits back TRANS_ACK 204 message as illustrated in FIG. 2. In addition, switch node 102 transmits TRANS 202 message of FIG. 2 to switch node 103. This message also requests that a video capability be set up between switch node 102 and switch node 103. Assuming switch node 103 is capable of providing the video capability, it transmits back to switch node 102 TRANS_ACK 206 message and transmits TRANS 203 to communication terminal 104. If communication terminal 104 can provide the video bandwidth, communication terminal 104 transmits to switch node 103 TRANS_COM 207 message. This message is repeated back to communication terminal 101 via switch nodes 103 and 102. If at a still later point in time, the user of communication terminal 101 desires that the video capability be eliminated, the messages illustrated in FIG. 2 are once more sent through the switch nodes. However, the TRANS messages now request that the video bandwidth be removed.

In video and audio calls, the video and the audio capability can be provided in the following two ways: first, a channel can be used for the video and a second channel can be used for the audio. Second, the audio information can be included with the video information in the video channel. The transport message can cause switch nodes to drop the audio channel and add the video channel with the companion audio information.

When processing the transport message, the switch nodes have the capability of negotiating with each other using the transport acknowledge (TRANS_ACK message). To illustrate this capability consider the following example. Communication terminal 101 wishes to add an audio, video and high speed data capabilities to a logical call with communication terminal 104. Communication terminal 101 transmits to switch node 102 a transport message requesting that these three types of bandwidth be added to the call. Switch node 102 has the resources to provide that capability and acknowledges this by the transmission of an acknowledge message to communication terminal 101. Switch node 102 then transmits a transport message to switch node 103. Switch node 103 only has resources sufficient to support audio bandwidth and video bandwidth and transmits this fact to switch node 102 in a transport acknowledge message. Switch node 102 accepts these conditions. Switch node 103 then transmits a transport message to communication terminal 104 requesting that audio and video capabilities be added to the call. Communication terminal 104 only has resources to provide only audio bandwidth. Since communication terminal 104 is the endpoint, it transmits back to switch node 103 a transport complete message. The transport complete message specifies that only audio bandwidth is provided for in this call. Upon receiving the transport complete message, each switch node changes the bandwidth capability for the call to audio only.

FIG. 3 illustrates the details of the four new messages utilized to implement the inventive concepts illustratively with respect to CCITT ISDN Q.931 standard of messages and procedures. One skilled in the art can readily see that the inventive concepts could be applied to other standards. The transport message is TRANS 300. The transport message consists of information elements (IE) 301–309 and 341. Protocol discriminator 301 IE defines the protocol that is being used. It defines that the protocol is ISDN Q.931 in the present embodiment. Call reference IE 302 gives the call reference number that defines the call for which the transport message is modifying the bandwidth. Message type IE 303 is set equal to TRANS since this is the transport message. Repeat indicator IE 304 defines whether the transport message is being used to add, remove, or change bandwidth on the call designated by call reference IE 302.

Bearer capability IEs 305, channel identification IEs 306, data link identification IEs 307, lower layer compatibility IEs 308, and higher layer compatibility IEs 309 define the totality of the transport capabilities being defined by the transport message. Lower layer compatibility IEs 308 and higher layer compatibility IEs 309 are used only by the endpoints. Whereas, bearer capability IEs 305, channel identification IEs 306, and data link identification IEs 307 are utilized by the switching nodes within the network providing transportation for the call. Note, that the endpoints also utilize IE 305, 306, and 307. Bearer capability IEs 305 define the requested capabilities in high level definitions such as voice, data, and video. The channel identification IEs 306 define the logical interface and physical channel within that physical interface. Between two switching nodes, the switching nodes negotiate a logical interface number for each interface between them. A network layer is responsive to the logical interface number to convert it to a system interface number (sintf) which lower layers convert to a physical interface number. For clarity, the high level description refers to the channel identification IEs as specifying the physical interface. For example, if video is being requested, then one of the channel identification IEs 306 for that request defines the physical interface and the channel such as channel 1 which is a 384 Kbs channel within the specified PRI link. If a voice capability was being requested, one of the channel identification IEs defines a particular B channel such as channel 23. An IE in the bearer capability IEs 305 requesting video has the same position in the bearer capability IEs 305 as the corresponding IE designating the physical interface and channel in the channel identification IEs 306. If packet data links are being requested, these are specified as to physical channels in channel identification IEs 306 with additional information being specified in the data link identification IEs 307. The IEs for data link identification are arranged in order as needed to support channel identification IEs 306. The information in bearer capability IEs 305 specifies when an IE from data identifications IEs 307 is needed. For example, if bearer IEs 305 specified: video, voice, and data, channel identification specifies the physical and only one data link identification IEs 307 is used. This IE would specify what logical link on the physical channel was to be used.

Figure 4:
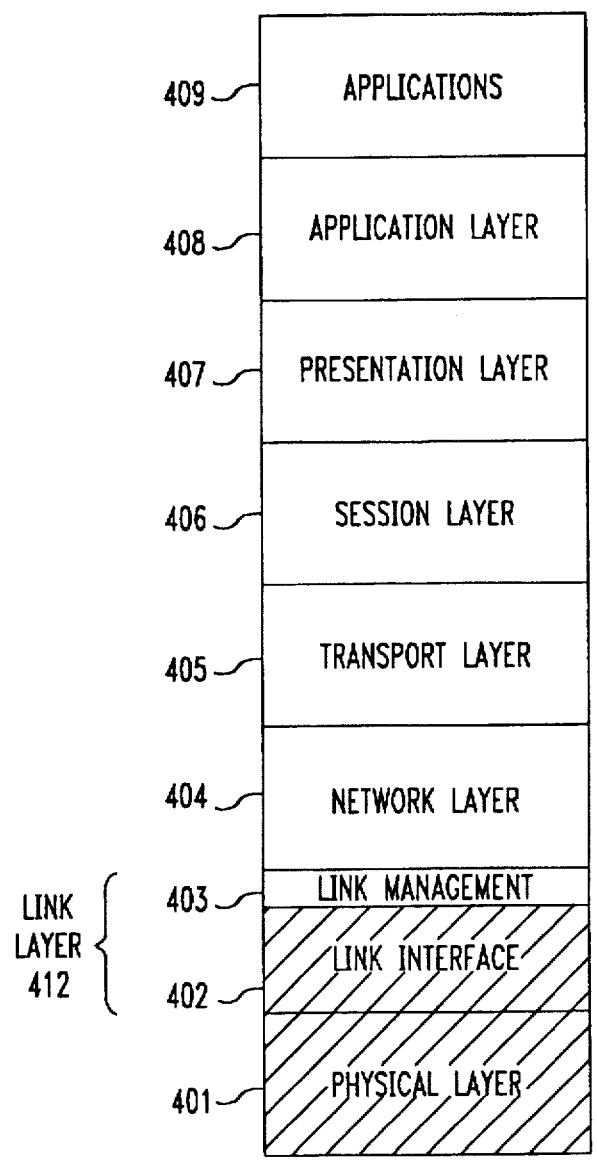
FIG. 4 illustrates a software architecture for use with the inventive concept.

Lower layer capability IEs 308 and higher layer capabilities 309 are usually utilized only by the endpoints, and these IEs are directed to defining for the destination endpoint what type of a call is being set up and the protocol being used. The low layer compatibility IEs 308 are utilized by physical layer, link management layer, and network layer as illustrated in FIG. 4; whereas, higher layer compatibility IEs 309 are utilized by software layers above network layer 404 of FIG. 4. To understand the relationship between the layer capabilities IEs and the bearer capability IEs, consider the following example. If a user wishes to set up a data packet connection utilizing LAPF protocol, from communication terminal 101 to communication terminal 104 the user can do this using two methods. The first method is to specify in the bearer capability that a LAPF packet connection is to be set up. In this case, it is not necessary to include any information in the lower layer capability IEs 308 and may not be necessary to include any information in the higher layer capabilities 309. The switch nodes are responsive to the bearer capabilities to set up the packet switching connection in the most convenient manner. In general, the switch node will set up this packet connection as a packet connection rather than as a circuit connection. In the second example, the user wishes to have a 64 Kb circuit connection set up through switching nodes 102 and 103 and only implement the LAPF protocol at the endpoints, communication terminals 101 and 104. In this case, communication terminal 101 would request in the bearer capability 305 of the transport message a 64 Kbs per second circuit switch connection. The transport message then would include in the lower layer capability of IEs 308 the fact that this is to be a packized data connection utilizing the LAPF protocol. In this manner, the packetized connection is guaranteed to have a predictable transmission time through switching nodes 102 and 103. In addition, the purpose may be to run a proprietary packet protocol on the circuit switch 64 Kbs data connection through switch nodes 102 and 103. Higher layer capability IEs 309 define to presentation layer 407 of FIG. 4 the high layer protocols that are to be used with information being received by the network layer. Presentation layer 407 conditions messages for use by the applications in applications layer 409 of FIG. 4. Examples of the types of protocols that presentation layer 407 may operate with are: X400 email standard, g4 fax standard, file transfer, or screen sharing standard. As can be easily seen, these higher level protocols are of no concern to the intervening switching nodes 102 and 103.

The transport acknowledge message, TRANS_ACK 310 is illustrated in FIG. 3. IEs 311,312, 314 have identical functions to those described for IEs 301,302, and 304. Message type IE 313 is set equal to TRANS_ACK. Upon receiving a transport message, a switch node within the network responds with a transport acknowledge message. If the receiving switching node can provide all of the transport capabilities requested in IEs 305, 306, and 307, the transport acknowledge message only consists of IEs 311—314. If the receiving switching node cannot provide a particular transport capability, that transport capability is defined in IEs 315 and 316 or IEs 317 and 316. For example, if the transport message has requested video transport which the receiving switching node cannot provide, then the video capability is specified in IEs 315 and 316 of the transport acknowledge message. Display IE 319 may define the reasons why this capability is not provided. If the sending switching node does not wish to accept the reduction of transport capabilities, the sending switching node's only option is to abandon the transport message request. Once again, call reference IE 312 defines which call the transport acknowledge message is associated with.

The transport complete message, TRANS_COM 320 is also illustrated in FIG. 3. The transport complete message is utilized to define to each switching node that is communicating the call the resulting transportation capabilities that have been added, removed, or changed with respect to the call. If all switching networks in the call path have accepted the requested transport capability, the transport complete message consists only of IEs 321–324. If one or more of the requested transport capabilities cannot be provided those capabilities are defined in IEs 325, 326, and 327. Each switching node in the call path retains a record of any transport capability that it may have eliminated from the receive transport message and includes this eliminated transport capability in the transport complete message. The result is that when the originating endpoint receives the transport complete message that message defines to the originating endpoint what the transport capability of the call is. Also, as intervening switching network nodes receive the transport complete message they eliminate transport capability that they had agreed to provide for the call if that transport capability is not present in the transport complete message.

Transport reject message, TRANS_REJ 330 is utilized to reject a transport message. IEs 331-333 and 339 are identical in function to IE 301-303 and 341 of the transport message. IE 334 defines the reason why the transport message is being rejected.

FIG. 4 illustrates the software architecture of the switching nodes of FIG. 1. This architecture is based on the conventional OSI model modified to implement the ISDN protocol. In accordance with the invention as described herein, certain further modifications have been made to the standard model in order to include ISDN capabilities.

The principal function of physical layer 401 is to terminate physical links. Specifically, physical layer 401 is responsible for maintaining physical channels and for controlling physical subchannels thereon. Physical layer 401 comprises a software portion and physical interfaces. Further, the software portion of physical layer 401 is responsible for the direct control of the physical interfaces to which physical links communicating PRI and BRI information terminate. Physical layer 401 presents to link layer 412 physical subchannels and physical channels as entities controllable by link layer 412.

The primary function of link layer 412 is to assure that the information transmitted over a physical channel over a physical channel is recovered intact and in the correct order. This is accomplished using another layer of protocol which allows multiple communication paths—commonly referred to as logical links—to be established on a given physical channel or a physical subchannel communicating packetized data. These logical links are used to identify and process data being communicated between link layer 412 and physical layer 401. (An example of this type of protocol is the LAPD packet protocol used in ISDN Q.921. In the ISDN standard, link layer 412 terminates the LAPD protocol.) Link layer 412 can support multiple protocols so that the upper layers are uneffected by the different protocols being utilized. Further, link layer 412 allows higher software layers to control physical layer 401 in an abstract manner.

As seen in FIG. 4, link layer 412 is divided into link interface 402 and link management 403. The reason for this division is set forth herein below. It will be helpful at this point to discuss the communication of ISDN signals over a D channel to help readers, for example, who have only a rudimentary knowledge of the communication of ISDN signals over a D channel. At link layer 412, a plurality of logical links is established on a D channel. Only one of these logical links communicates ISDN control signals, and this logical link is referred to herein as a logical D channel (LDC). The LDC is identified by a logical D channel number (LDCN).

Link interface 402 does the majority of the functions performed by link layer 412, including the establishment of the logical links. Link management 403 identifies the various link interfaces for higher software layers. Further, link management communicates information between the logical links and higher software layers.

Network layer 404 processes information communicated on the LDCs, and thereby terminates the ISDN Q.931 protocol. Hence, this layer is responsible for negotiating the utilization of system resources for the termination or origination of calls external to a switching node. The network layer controls the allocation of channels on an interface on which a call is being received or set up. For example, if communication terminal 101 receives a call from switching node 102 via PRI link 150, network layer 404 of communication terminal 101 negotiates with its peer layer (the corresponding network layer 404 in switching node 102) in order to obtain allocation of a B channel in PRI link 150—a procedure later to be repeated if a second B channel is desired. This negotiation is carded out using standard ISDN Q.931 messages such as the call setup and connection messages via the LDC setup on the D channel of PRI link 150. Network layer 404 identifies all B channels of given interface with the LDC for that interface. Network layer 404 is only concerned with the establishment of a call from one point to another point (e.g., switching node to switching node). The network layer is not concerned with how a call is routed internally to a particular switching node but rather transfers information up to higher layers for the determination of how a call is routed in the switching node. However, the network layer does request that one application, referred to here and below as the connection manager application, add or remove facilities on a physical interface to a switch connection within a switching node.

Specifically, the network layer carries out call setup by first determining that the request for the establishment of a call is valid and that the resources between the two switching systems are available to handle this call. After this determination, information concerning the call is transferred to higher software layers. The reverse is true when the network layer receives a request from the higher software layers to establish a connection with another switching node.

Network layer 404 receives information from another node concerning a call via a LDC. As information is received on the LDC, a call reference number is utilized to identify the call associated with this message. The call reference number is selected by the originating network layer during call setup in accordance with the ISDN standard. Details of this identification are given with respect to FIG. 14.

Transport layer 405, is the key element that allows the routing of a call through a complex system having multiple nodes as illustrated in FIG. 1. Its primary function is to manage the routing of calls externally, i.e., between switching nodes. Transport layer 405 views the system of FIG. 1 in terms of nodes and is concerned with routing calls from its own node to other nodes or endpoints. (As explained in the detailed discussion of session layer 406, that layer, not transport layer 405, interprets logical destination information, such as a telephone number, to determine the destination node of a call and to establish an intra-node path by using the connection manager application.) In an overall system comprising multiple switching nodes such as communication terminal 101, the various transport layers communicate with each other in order to establish a call through the various switching nodes. This communication between transport layers is necessary because it may be necessary to route the call through intervening nodes to reach the destination node. The transport layers communicate among themselves utilizing signaling paths (LDCs) established between switching nodes.

With respect to inter-node routing, transport layer 405 is the first layer that starts to take a global view of the overall system illustrated in FIG. 1. Transport layer 405 uses information provided by session layer 406 to select the inter-node path. The transport layer performs its task of routing between various nodes by the utilization of tables defining the available paths and the options on those paths. These tables do not define all paths but only those paths which the node has already used.

Communication between transport layers is done by network layer 404 using established LDCs. Transport layer 405 communicates information destined for its peers to network layer 404, and network layer 404 packages this information within the information elements, IEs, of standard ISDN Q.931 messages. Network layer 404 uses the LDC that has been set up to a particular node to communicate this information to its peer network layer. Similarly, when another network layer receives information of this type, the other network layer unpackages information and then directs the information to the transport layer.

The primary function of session layer 406 is to establish communication among endpoints with all endpoints considered to be applications including, for example, a BRI station set is considered an application. Significantly, these endpoints may be applications such as TMA applications. In any event, connections between such endpoints is considered a call. A session (call) is set up by session layer 406 any time two applications require communication with each other. As noted earlier, session layer 406 deals only in terms of switching nodes and applications on those switching nodes and relies on transport layer 405 to establish paths to other switching nodes. Session layer 406 identifies the called application by an address which previously in the telecommunication art was thought of as only a telephone number but has a much broader concept in the Q.931 protocol. From this address, session layer 406 determines the destination switching node. Session layer 406 sets up a call to the destination switching node by communicating with the session layer of the destination switching node. The communication with the other session layer is accomplished by having the session layer request its transport layer to place a call to the other switching node so that a connection can be made for a particular address. The transport layer places the call relying on the node number that was determined by the session layer. These requests are layer to generate standard ISDN Q.931 call setup messages. If the other switching node cannot interpret the address, the session layer of that switching node transmits information to its transport layer requesting that the call be dropped. If the session layer can interpret the address, it sends a message to its transport layer requesting that a call proceeding message be transmitted by its network layer back to the requesting switching node.

Presentation layer 407 of FIG. 4 invokes a complex protocol in order to groom the information being communicated between applications so that the applications are totally divorced from the protocol used to communicate the information. A presentation level protocol allows an application to communicate with a peer application across a transport path.

Finally, application layer 408 manages the resources needed by the applications running at software layer 409. When an application at software layer 409 is communicating with another peer application, the application is unaware of how many other applications exist or where these other applications are located. It is the function of application layer 408 to determine and use such details, consequently allowing the applications to be written in a very abstract manner.

Further information on the operation and software structure of layers 401 through 409 is given in U.S. Pat. No. 5,386,466, entitled "Automatic Initialization of a Distributed Telecommunications System. U.S. Pat. No. 5,386,466, is hereby incorporated by reference. A switch node with a video network is described in U.S. patent application Ser. No. 08/085,997, entitled "Video View Selection by a Chairperson", file Jun. 30, 1993, and assigned to the same assignee as the present application is hereby incorporated by reference.

Figure 5:
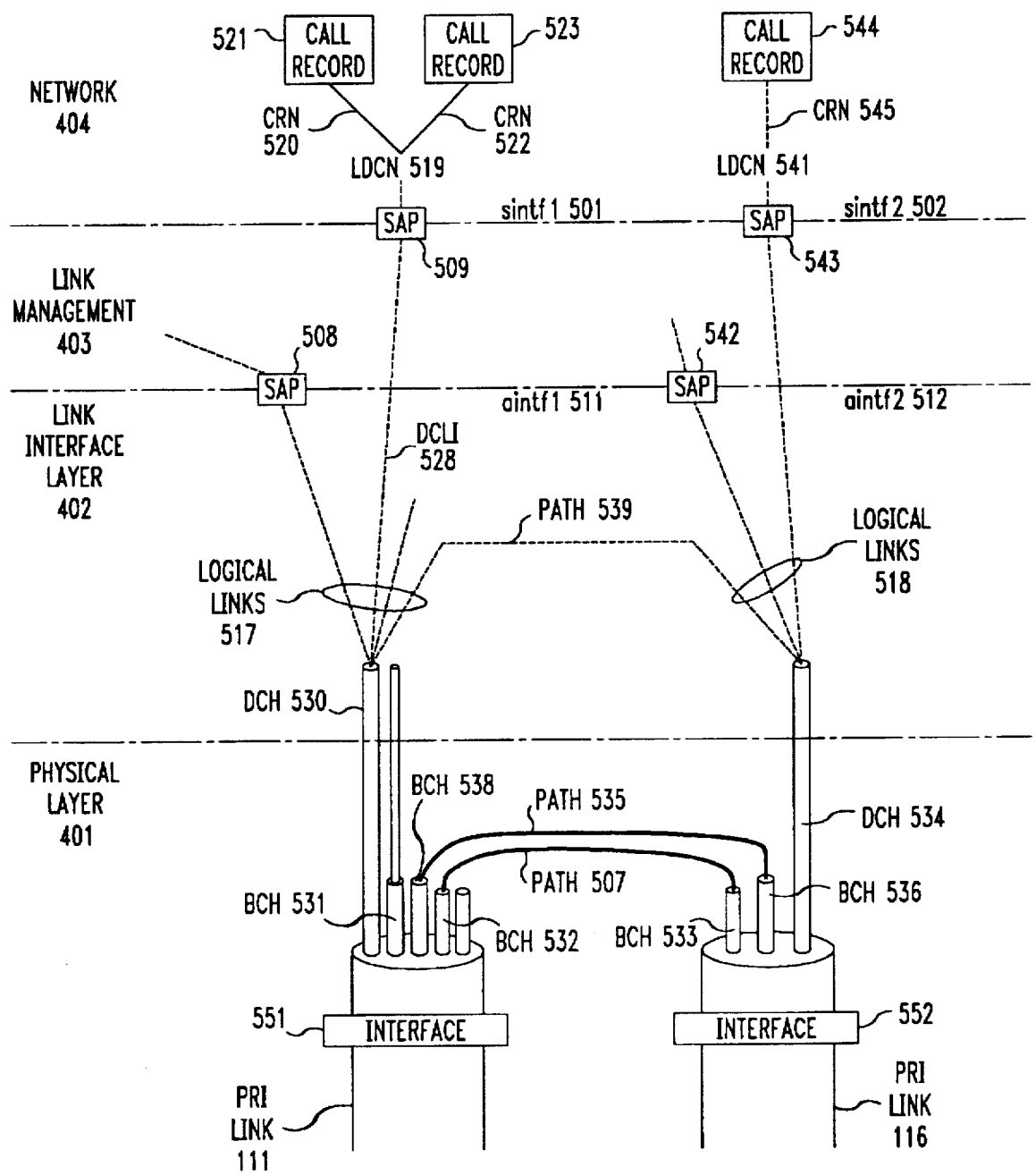
FIG. 5 logically illustrates the signaling and transport paths that are set up within a switch node.

FIG. 5 logically illustrates the general relationships between data link connection identifiers (DLCI), service access point identifiers (SAPI), terminal end identifiers (TEI), system interface numbers (sintf), switches angel interface numbers (aintf), logical D channel numbers (LDCN), call reference numbers (CRN), and the various software layers. As illustrated in FIG. 5, the pair of link interface layers and physical layers are implemented on an angel. (The concept of angels is explained in U.S. Pat. No. 5,386,466.) Link interface layer 402 and physical layer 401 are implemented by a local angel. A node processor in switch node 102 implements link management 403, network 404, and higher layers. The node processor provides overall control of switch node 102. Sintf, switch and aintf numbers correlate to physical interfaces. The sintf numbers are utilized by network software layer 404 and higher software layers to identify physical interfaces. In addition, two switching nodes, interconnected by a link that is terminated on both ends by a physical interface, negotiate a logical interface number for the link during initialization of the link.

When a transport message is received, network layer 404 converts the logical interface numbers in the channel identification IEs to sintf's. Network layer 404 views the physical interfaces as being identified by sintf1 501 and 502. Link management 403 makes a conversion between the sintf numbers and the switch and aintf numbers which together represent the physical interface. For example, link management 403 converts sintf1 501 to the local angel and aintf 511. Link interface layer 402 utilizes aintf 1511 to identify physical interface 551. There is a one for one correspondence between sintf1 501 and sintf2 502 and aintf1 511 and aintf2 512.

The sintf and aintf numbers identify specific interfaces, and each interface has a number of channels. For example, PRI interfaces 551 and 552 each have 24 channels. Network layer 404 identifies the channels associated with a particular sintf by using the actual physical channel numbers, and similarly, link interface layer 402 utilizes the physical channel numbers in association with an aintf number. This is possible because the specifications of the ISDN standard designate that physical channel 24 is used to perform signaling. Network layer 404 and higher layers utilize sintf numbers in order to control the link interface layers and physical layers to interconnect physical channels and to create specific protocols on these channels. The manner in which B channels are interconnected through physical networks such as network 515 is not illustrated in FIG. 5 except in a logical manner, e.g. path 507.

Further, FIG. 5 logically illustrates the utilization of the various channels and the points at which these channels are terminated and at which information is utilized. B channel 532 of interface 551 is interconnected to B channel 533 of interface 552 by path 507. Path 507 is made through a network internal to a switch node. It would be obvious to one skilled in the art that similar paths could be made between B channels in interface 551 and 552. The circuit switching of B channels is performed at the physical layer; whereas, packet switching or frame relaying is performed at the link interface layer. Greater detail on operations of the layers of FIGS. 5 and 6 in setting up a call are set forth in U.S. Pat. No. 5,386,466.

This section describes the transport messages from the prospective of applications software layer 409, session software layer 406, transport software layer 405, and network software layer 404 through switch node 102. To clarify the explanation, first a brief description is given of how a call is initially set up through switch node 102.

Figure 6:
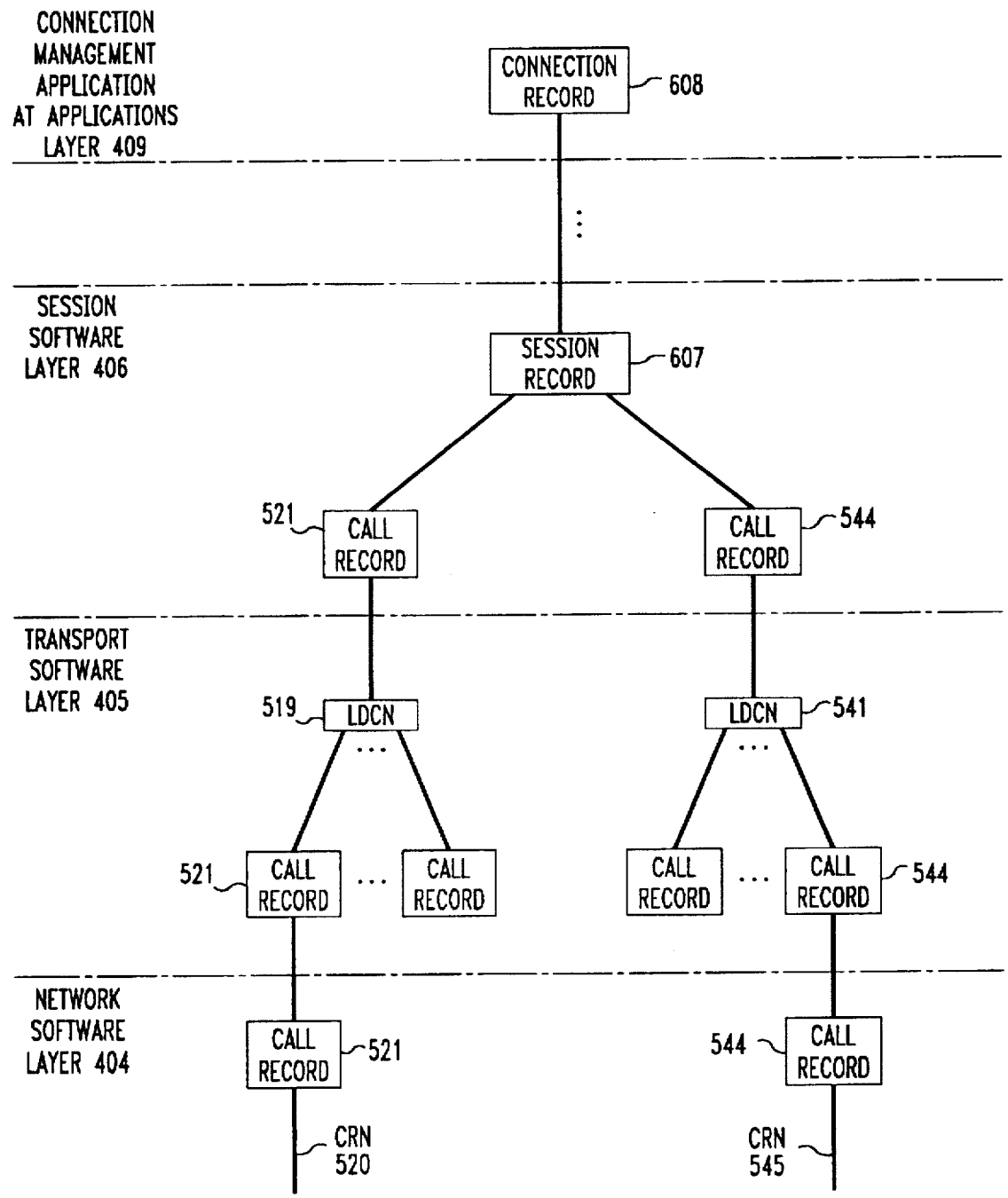
FIG. 6 illustrates the logical structure of a call through the network, transport, session, and application software layers.

FIG. 6 illustrates the manner in which calls are identified and processed between network software layer 404, transport software layer 405, session software layer 406, and applications software layer 409. Switching node 102 is executing these software layers. At network software layer 404, each half of a call is identified by the CRN number, e.g. CRN 520, and a call record, e.g., call record 521, as previously described with respect to FIG. 5. As can be seen from FIG. 6, the call record is common throughout the software layers, and each layer uses additional information along with the call record. The call records are taken from a common table within each switching node, and a call record number is unique within a particular switching node.

Transport software layer 405 identifies each half of a call by the LDCN and call record number. The LDCN is utilized because the information illustrated in the level 4 routing tables is identified by the LDCN number which denotes the link (or set of links) out of a switching node to another switching node. Notice that the call record is identified identically at all three software layers as illustrated in FIG. 6 for a particular call. Session software layer 406 is the point within the software architecture where halfs of calls are joined together for purposes of exchanging signal information by each call having a unique session record set up for it such as session 607. The session record is associated with two call records such as call record 521 and call record 544 with each call record representing half of a call. (Each half of a call is referred to as a "half call".) An exception to this rule is if the call is to an application. In that case, only one call record is utilized since the other half of the call terminates at the application software layer.

To understand how calls are processed by the three software layers illustrated in FIG. 6, first consider the example of setting up a call through switch node 102. For this example, reference must be made to FIG. 5 which illustrates the interfaces associated with call records 521 and 544. Call record 521 is associated with PRI link 111, and call record 544 is associated with PRI link 116 in the following example.

Assume that a call is being placed from communication terminal 101 to communication terminal 104 via switching node 102. LDCN 541 is associated with PRI 116 which interconnects switching node 102 to switching node 103 as illustrated in FIG. 1. Further, assume that the node number in the setup messages designates communication terminal 104. (The manner in which routing decisions are made in switch node 102 for a call from communication terminal 101 to communication terminal 104 is set forth in U.S. Pat. No. 5,386,466.) When the setup message is received from communication terminal 101 via PRI link 111, network software layer 404 generates a setup indication which is communicated to transport software layer 405 and establishes call record 521 which starts the setting up of the first half call. Transport software layer 405 examines the node number and determines that switching node 102 is not the destination switching node; hence, layer 406 does not set a node flag. If the node flag was set, this indicates that the call terminates on switch node 102. The dialed number along with the node flag is communicated to session software layer 406 which, because the node flag is not set, does not attempt to route a call based on the dialed number. Since in the present example the node flag is not set, session software layer 406 establishes session record 607 and call record 544 is selected which starts the setting up of the second half call. The node and the call record number are then communicated to transport software layer 405 as a setup request. Transport software layer 405 interrogates the level 4 routing table and determines that LDCN 541 is a path to communication terminal 104. Transport software layer 405 then associates call record 544 with LDCN 541 and transmits the setup request to network software layer 404 which then establishes communication with switching node 103 via PRI link 116.

After switch node 102 has sent a setup message to switch node 103 via PRI link 116, the network software layer of switch node 103 responds with a call proceeding. Network software layer 404 is responsive to the call proceeding message to notify a connection management application that it should establish the connection through switch node 102 switching network to interconnect B channel 532 and B channel 533 so as to establish path 507. Session record 607 points to connection record 608. Connection record 608 is maintained by the connection management application which is executing at applications layer 409. The connection management application is responsive to the message from network software layer 404 to establish this connection and to enter into connection record 607 the parameters of the internal connection.

To further understand how the transport messages are utilized to increase or decrease bandwidth through switch node 102, consider the following example. Assume that the setup message that was described in the previous paragraph setup a voice connection through switch node 102 which resulted in path 507 of FIG. 5 being set up through the switching network of switch node 102. Next, communication terminal 101 requests that a packet switch connection be established on D channel 530 and that a 64 Kb data channel be established on channel 538 by using a transport message.

In order to establish the additional bandwidth necessary for the data link executing the LAPF protocol and a data channel having 64 Kbs, communication terminal 101 transmits to switch node 102 a transport message that has the following information. Call reference IE 302 is set equal to CRN 520 of FIGS. 5 and 6, message type IE 303 is set equal to TRANS. Repeat indicator IE 304 is set to add bandwidth. Bearer capability IEs 305 are as follows. The first bearer capability IE specifies a packet data link using the LAPD protocol, and the second IE is set equal to a circuit data link with 64 Kbs of bandwidth. Channel identification IEs 306 are as follows. The first IE specifies interface 551 utilizing the logical interface number, and specifies the use of D channel 530. The second IE of the channel identification IEs 306 specifies interface 551 and B channel 538. A single data link identification IE 307 follows and specifies that one of the logical links 517 is to be used for packet data. Lower layer capability IE 308 specifies the proprietary protocol that communication terminal 104 is to implement with respect to the 64 Kb data channel. Higher layer compatibility IE 309 specifies that the X400 email protocol standard is being implemented. This transport message is received and disassembled by network software layer 404 of FIG. 6. If network software layer 404 is capable of providing the requested transport capabilities, network transport layer 404 responds with a transport acknowledge message that contains only IEs 311, 312, 313, and 319. If network 404 cannot provide one of the requested transport capabilities, it identifies the particular transport capability that could not be provided in IEs 315, 316, and 317, and indicates in the repeat indicator 314 that this particular transport capability must be deleted. In addition, the transport acknowledge message could also indicate using another bearer capability, channel identification, and data link identification IEs, as an alternative to what had been requested.

In the present example, network software layer 404 can provide the requested transport capabilities. Network software layer 404 then transmits to session software layer 406 via LDCN 519 of transport software layer 405 the request to add transport capabilities. Session software layer 406 utilizes session record 607 to call record 544 to determine that the call utilizes LDCN 541 and uses LDCN 541 to notify network software layer 404 that additional work is to be done with respect to call record 544.

Returning for a moment to the left half of the call that is illustrated by call record 521 and LDCN 519 of FIG. 6. Network software layer 404 transmits to the connection management application the new parameters that have been added to the connection identified by call record 521. The connection management application is responsive to this information to store the additional connection information in connection record 608.

In the fight half of the call that is identified by call record 544 and LDCN 541, network software layer 404 is responsive to the bearer capability IEs of the message that has been received from communication terminal 101 to determine which transport facilities should be utilized to meet the requirements of these bearer capability IEs. As illustrated in FIG. 5, network software layer 404 utilizes one of the logical links of logical links 518 to provide the data link utilizing the LAPD protocol and B channel 536 to provide the capabilities of the 64 Kb data channel. Note, if network software layer 404 had available a B channel which had been subdivided into logical links, network software layer 404 could have used one of these logical links for the data link executing the LAPF protocol. Network software layer 404 now forms a new transport message that includes the bearer capability IEs that are identical to those received from communication terminal 101 and channel identification IEs 306 and data link identification IEs 307 that are specific to the transport capabilities being utilized with interface 552. The lower layer compatibility IEs 308 and higher layer compatibility IEs 309 are simply transported up the left half of the call to session software layer 406 which then transmits them dowm the right half of the call where they are assembled into the new transport message by network software layer 404. Network software layer 404 then transmits the transport message to its peer network software layer in switch node 103.

In our present example, the network software layer in switch node 103 accepts all of the transport capabilities requested in the transport message. The network software layer in switch node 103 responds with a transport acknowledge message which contains no IEs 315, 316, or 317. Network software layer 404 in switch node 102 is responsive to this transport acknowledge message to transmit to the connection management application in application layers 409 of FIG. 6 the parameters for the left half of the call so that these can be stored in the connection record 608. The connection management application is also responsive to this information to control the switching network of switch node 102 to setup path 535. In addition, connection management application transmits a message to link interface layer 402 to setup path 539.

At this point, paths 507, 535, and 539 are set up through switch node 102. In the present example, when switch node 103 attempts to establish the original transport capabilities, communication terminal 104 is unable to provide the data link utilizing the LAPD protocol. The result is that switch node 103 in the left half of the call which is similar to that illustrated in FIG. 6 has recorded in its connection record the voice bandwidth, the data link using LAPD protocol, and the 64 Kb data channel. However, in the connection record for the right half of the call, only the voice call and the 64 Kb data link are recorded. Upon receiving the transport complete message from communication terminal 104, via network software layer, the connection management application in switch node 103 only connects the 64 Kb data link. Note, that the voice call connection was made during the setup process. Communication terminal 104 then transmits a transport complete message that identifies the bearer capability, channel identification IEs, and data link identification IEs that are in use. This message is received by switch node 103 and is transferred up the right half of the call through the software layers to session software layer 406 of switch node 103 which communicates it down the left half of the call to network software layer 404 of switch node 103. Network software layer 404 eliminates the data link capabilities and informs the connection management application that the data link is no longer being utilized. In response, connection management application of switch node 103 eliminates the data link information from connection record of switch node 103. Network software layer 404 in switch node 103 then assembles a transport complete message that details the fact that only the 64 Kb data link has been set up and transmits this transport complete message to switch node 102.

When network software layer 404 of switch node 102 receives the transport complete message from switch node 103, it informs the connection management application that path 539 is to be eliminated. The connection management application then eliminates from connection record 608 reference to the data link executing the LAPD protocol. Network layer 404 then transmits the transport complete message through session software layer 406 down into the left half of the call. Network software layer 404 is responsive to this transport complete message to notify the connection management application to eliminate the reference to the data link executing the LAPD protocol from connection record 608. The connection management application also transmits a message to link interface layer 402 to remove path 539. In the left half of the call, network software layer 404 then assembles another transport complete message for transmission to communication terminal 101.

At a later point in time, communication terminal 101 determines that the 64 Kb data link is no longer required, communication terminal 101 transmits a transport message where repeat indicator 304 is set equal to remove and the bearer capability IEs 305, channel identification IEs 306, and data link identification IEs 307 specify that the 64 Kb data link is to be removed. Switch node 102 then repeats this message and sends it to switch node 103. Upon receiving the transfer acknowledge message back from switch node 103, network software layer 404 requests that the connection management application remove path 535. In addition, connection management application updates the connection record 608 as requested by network software layer 404. When the transport message requesting the removal of the data link is received by communication terminal 104, it responds with a transport complete message that specifies that this removal should have taken place.

Returning now to when communication terminal 104 received the transport message that set up the 64 Kb data channel, communication terminal 104 responds in a similar manner with respect to IEs 305 through 307 as the other switch nodes did. The termination point of a call is a terminal management application that is executed in applications level 409 of FIG. 4. Greater details on the functions of a terminal management application are given in U.S. Pat. No. 5,182,751 and U.S. Pat. No. 5,386,466. Briefly, a terminal management application provides all of the control functions required to terminate a call and to allow the terminal to utilize the communicated data. A terminal management application can be executed on a switch node whereby the majority of the terminal control functions are done in the switch node rather than within the communication terminal. On the other hand, a communication terminal, such as communication terminal 101, does have its own computer and is executing the software structure illustrated in FIG. 4. In this case, the terminal management application is executing on the terminal. As illustrated in FIG. 1, communication terminal 101 is then the termination point of the call. However, with a different type of communication terminal being utilized for communication terminal 101, the terminal management application could be executing in switch node 102 which would be the termination point of the call.

When the transport message was received to set up the 64 Kb data channel, this message was transported to the terminal management application at applications level 409. The terminal management application then requested that the connection manager request that link interface layer 402 implement the proprietary protocol that is defined in the low layer compatibility IEs 308 so that the link interface layer can properly use the low level proprietary protocol. In addition, the connection manager application instructs the presentation layer 407 of communication terminal 104 to implement the X400 email standard as defined in by the higher layer compatibility IE 309.

Figure 7:
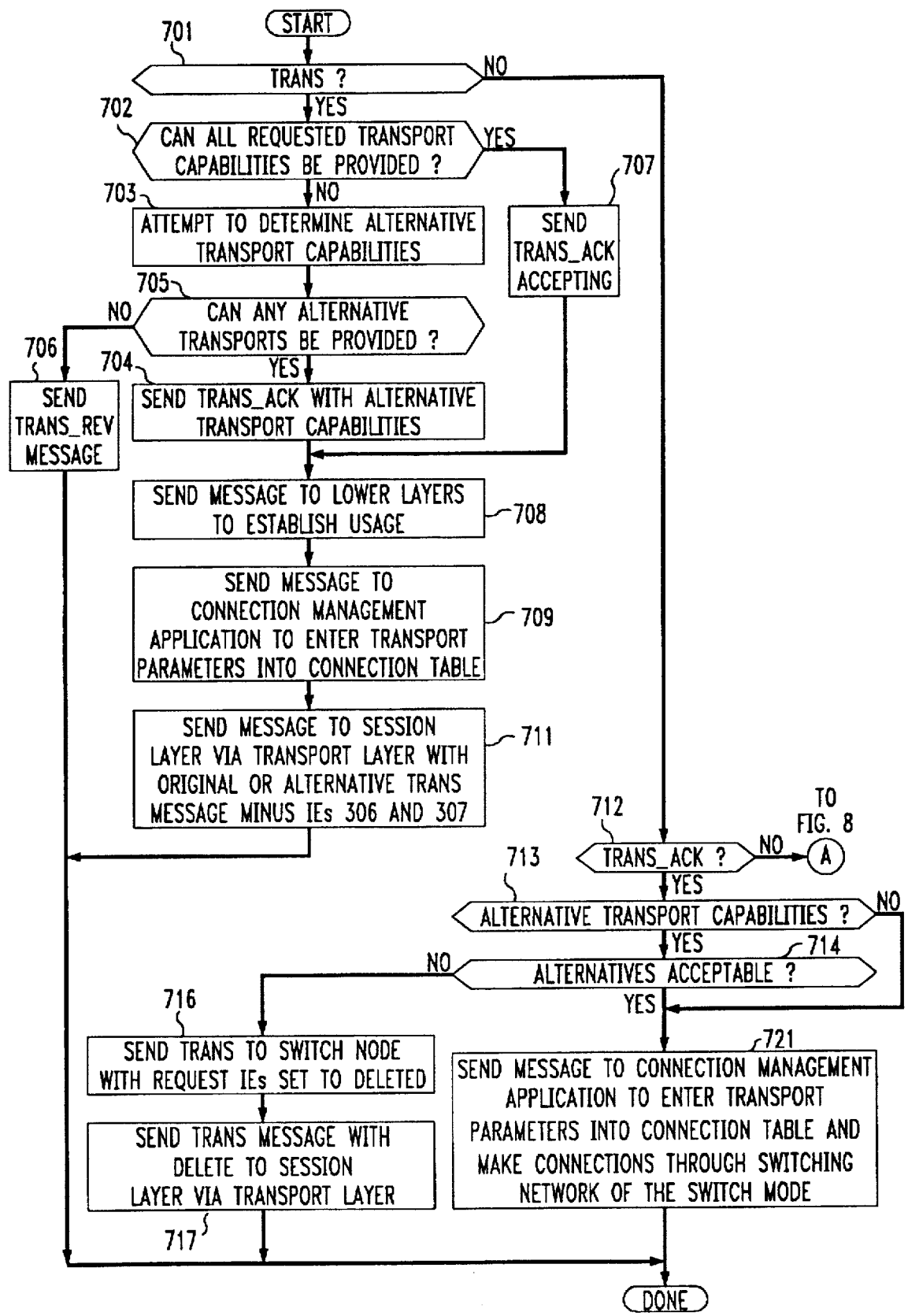
FIGS. 7, 8, and 9 illustrate, in flow chart form, the response of a network layer to the transport messages.
Figure 8:
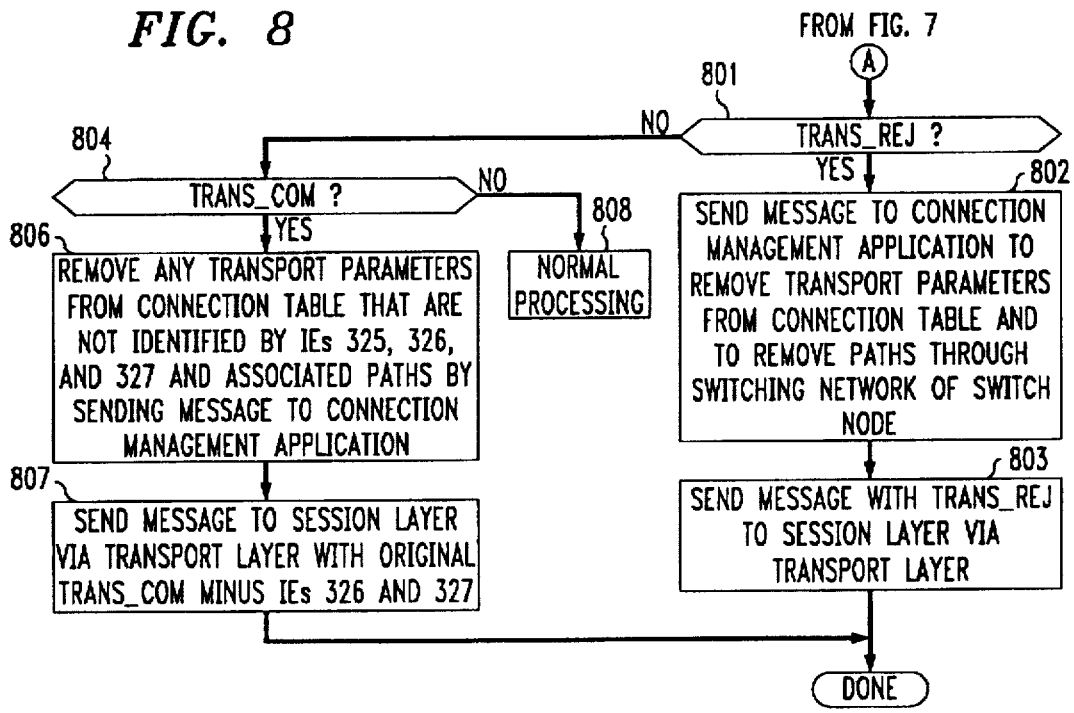
Figure 9:
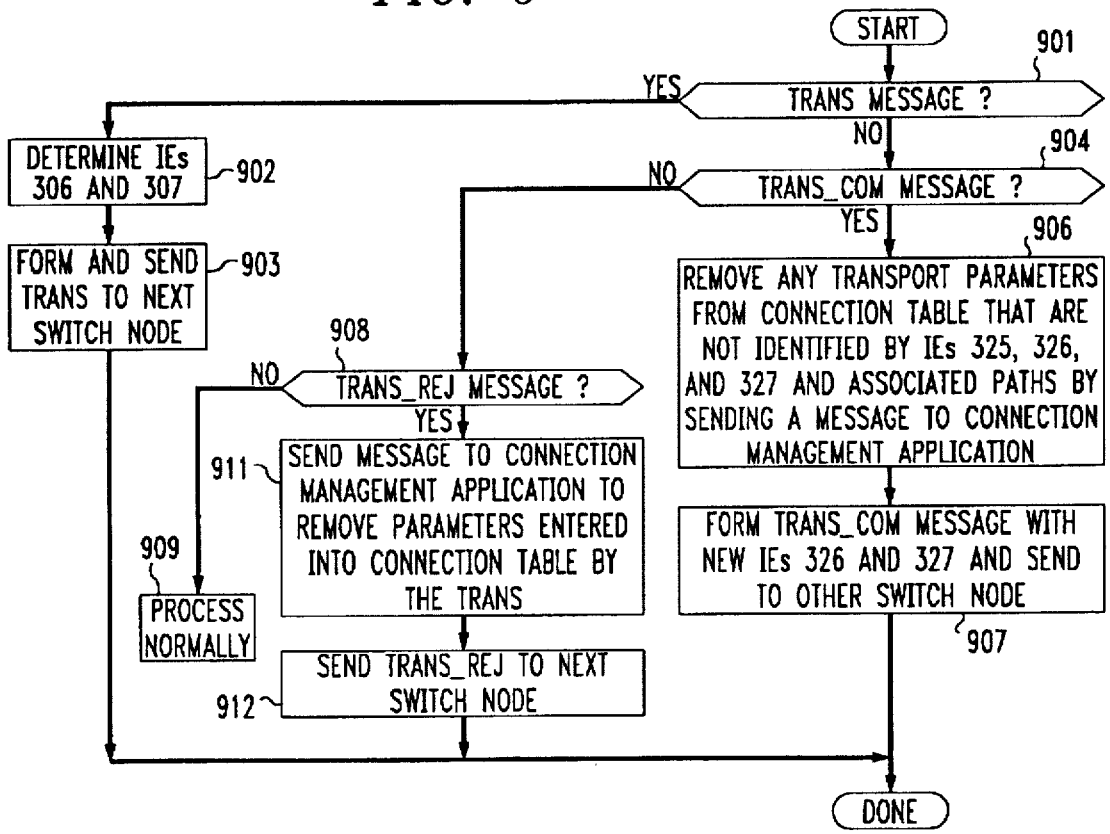

FIGS. 7, 8, and 9 illustrate, in flowchart form, the operations performed by network software layer 404 in implementing the transport messages illustrated in FIG. 3. Network software layer 404 performs the majority of the work in implementing the transport messages. FIGS. 7 and 8 illustrate the responses of network layer 404 upon receiving a transport message from another switching node. FIG. 9 illustrates the responses of network software layer 404 upon receiving a transport message from the session layer 406. The convention used in these figures is that transport messages being received or sent to another switch node are identified only by their message code, e.g., TRANS. On the other hand, transport messages being relayed by session software layer 406 from the other half of the call are designated by the message code and the word "message", e.g., TRANS message.

Decision block 701 of FIG. 7 determines whether a TRANS message has been received from another switch node. In the previous example, switch node 102 receives a TRANS message via interface 551 from communication terminal 101. If the answer in decision block 701 is yes, decision block 702 determines whether the requested transport capabilities that are defined by bearer capability IEs 305, channel identification IEs 306, and data link identification IEs 307 can be provided. If the transport capabilities can be provided, block 707 is executed which sends back a TRANS_ACK message that contains no IEs 315, 316, and 317. If the answer in decision block 702 is no, block 703 attempts to determine an an alternative transport capability.

If none of the transport ca provided, a TRANS_REJ message is sent and all further processing is terminated. If at least one original or alternative transport capability can be provided, a TRANS_ACJ message is returned with the modified list of transport capabilities. Next, block 709 sends a message to the connection management application at applications layer 409 requesting that the transport parameters as defined by the new transport capabilities be entered into connection table 608. The transport parameters entered are either those of the originally requested transport capabilities or the alternative transport capabilities or the resulting combination of the two. Finally, block 711 sends a TRANS message to session layer 406 via transport layer 405 which is the original TRANS message and/or alternative transport capabilities minus IEs 306 and 307. IEs 306 and 307 are unique to the left half of the call as illustrated in FIG. 6. Session software layer 406 is responsive to this message to identify the call record, to identify LDCN associated with the right half of the call, and to send the message down the fight half of the call with the proper identification to network software layer 404.

Returning to decision block 701, if the answer is no, control is transferred to decision block 712 which determines if a TRANS_ACK message was received from another switch node. In the previous example, a TRANS_ACK message was received by switch node 102 from switch node 103 on interface 552. This TRANS_ACK message was received by the right half of the call. If the answer in decision block 712 is yes, control is transferred to decision block 713. The latter decision block determines if there are alternative transport capabilities in the transport acknowledge message. If the answer is yes, control is transferred to decision block 714 which determines if the alternative transport capabilities are acceptable, i.e., the switch node can provide the alternative transport capabilities. If the answer in decision block 714 is no, block 716 is executed which sends a TRANS message to the other switch node with a request to delete any transport capabilities that are not acceptable. Next, block 717 sends a TRANS message with the same delete request included to session software layer 406 via transport layer 405. Session layer 406 is responsive to that message to transport the message down the left half of the call to network software layer 404. Note, that the transport parameters are only inserted into the connection record and paths established within a switch node upon reception of an acceptable TRANS_ACK message.

Returning to decision blocks 713 and 714. If the answer in decision block 713 is no, or the answer in decision block 714 is yes, control is transferred to block 721 which sends a message to the connection management application to enter the transport parameters into the connection table and to make the connections through the internal switching network of the switch node.

Returning to decision block 712, if the message is not a TRANS_ACK message, control is transferred to decision block 801 of FIG. 8 which determines if the message is a TRANS_REJ message. If the answer in decision block 801 is yes, block 802 sends a message to the connection management application to remove the transport parameters from the connection table and to remove any paths having been set up for those transport parameters through the switching network of the switch node. Note, that there may not be any work for the connection management application to do if the TRANS_REJ message is received in place of a TRANS_ACK. After execution of block 802, block 803 sets a message containing the TRANS_REJ message to session layer 406 via transport layer 405. Session software layer 406 sends this message down the left half of the call with the proper call record and LDCN identification information to network software layer 404.

If the answer in decision block 801 is no, control is transferred to decision block 804 which determines if the message is a TRANS_COM message. If the answer is no, control is transferred to block 808 which provides normal processing. Block 808 handles the standard ISDN messages. If the answer is yes in decision block 804, block 806 determines which transport parameters that are in connection table 608 are not identified by the bearer capability IEs 325, channel identification IEs 326, and data link identification IEs 327. After identifying these transport parameters, block 806 transmits a message to the connection management application to remove these transport parameters and any associated paths. Finally, block 807 sends a message to session software layer 406 via transport software layer 405 that contains the original TRANS_COM minus the channel identification IE 326 and the data link identification IE 327. Session software layer 406 is responsive to that message communicated down the left half of the call to network software layer 404 with the call record and LDCN identification information.

FIG. 9 illustrates the operations performed by network software layer 404 in response to transport messages being received from session software layer 406. Decision block 901 determines if the message is a TRANS message. In the previous example, the right half of the call illustrated in FIG. 6 receives a TRANS message from session software layer 406 after the left half of the call had received that message from communication terminal 101 via interface 551. If the answer is yes in decision block 901, control is transferred to block 902. Block 902 is responsive to the bearer capability IEs 305 to determine what the new channel identification IE 306 and data link identification IEs 307 should be for the TRANS message that will be transmitted to the next switch node. After this determination is made, block 903 forms and sends the new TRANS message to the next switch node. Note, that elements 301,302, 303, 304, 305, and 308, 309, and 341 are simply repeated in the new TRANS message.

If the answer in decision block 901 was no, decision block 904 determines if the message received from session software layer 406 is a TRANS_COM message. If the answer in decision block 904 is yes, decision block 906 determines the transport parameters that are in connection table 608 that are not identified in bearer capability IEs 325, channel identification IEs 3216, and data link identification IE 327. After determining these transport parameters, block 906 transmits a message to the connection management application requesting that these transport parameters be removed from the connection table 608 and that all associated paths be removed. Next, block 907 forms a TRANS_COM message with new channel identification IEs 326 and data link identification IEs 327 that define the transport capabilities on the left half of the call. Block 907 then sends the formed TRANS_COM message to the other switch node.

If the answer in decision block 904 is no, control is transferred to decision block 908 which determines if a TRANS_REJ message was received from session software layer 406. If the answer is no, control is transferred to block 909 for normal processing of standard ISDN messages. If the answer in decision block 908 is yes, block 911 sends a message to the connection management application to remove all parameters entered into connection table 608 by the associated TRANS message. Finally, block 912 sends a TRANS_REJ message to the next switch node. In the previous example, block 912 sends the TRANS_REJ message from switch node 102 to communication terminal 101.

Figure 10:
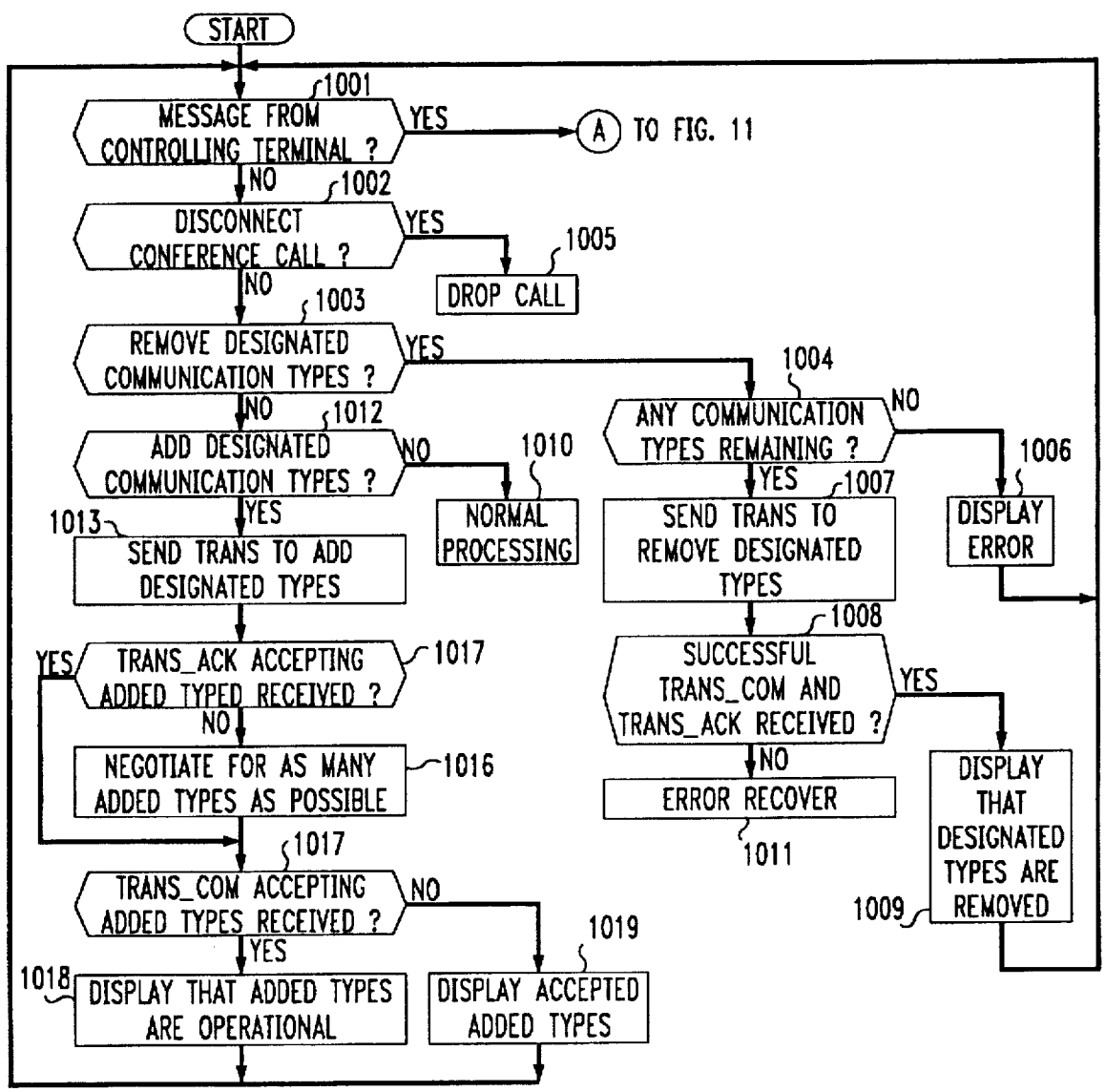

FIG. 10 illustrates the operations performed by a communication terminal (that is not the controlling communication terminal of the multimedia conference call) in utilizing the selective participation operation with respect to the multimedia communication conference call. Decision block 1001 determines if there is a message from the terminal controlling the multimedia conference call. If the answer is no, decision block 1002 determines if the user of the terminal wishes to disconnect from the conference call. If the answer is yes, block 1005 is executed which drops the terminal from the multimedia conference call. If the answer in decision block 1002 is no, decision block 1003 is executed to check if the user of the communication terminal wishes to remove any of the communications types presently being used in the multimedia conference call. If the answer is yes, decision block 1004 checks if the communication terminal has any communication types remaining for participating in the multimedia conference call. If the answer is no, an error is displayed to the user of the communication terminal by execution of block 1006 and control is transferred back to decision block 1001. If the answer in decision block 1004 is yes, block 1007 transmits a TRANS message to the controlling communication terminal to remove the designated communication types. After execution of block 1007, block 1008 first checks for a TRANS_ACK message accepting the reduction in communication types and subsequently a TRANS_COM message also accepting the reduction of the designated communication types. Since it should be possible to reduce the communication types, if the answer in decision block 1008 is no, error recovery is performed by execution of block 1011. If the answer in decision block 1008 is yes, block 1009 displays the designated types that were removed to the user and returns control to decision block 1001.

Returning to decision block 1003, if the answer is no, control is transferred to decision block 1012 which determines if the user wishes to add new communication types to the user's participation in the multimedia communication conference call. If the answer is no, control is transferred to block 1010 which performs normal processing. If the answer in decision block 1012 is yes, block 1013 transmits a TRANS message to the controlling communication terminal to add the designated communication types. After execution of block 1013, decision block 1014 determines if the TRANS_ACK message received back from the switch node accepting the added types. If the answer is no, block 1016 negotiates with the switch node for as many of the added communication types as are possible and transfers control to decision block 1017. If the answer in decision block 1014 is yes, control is transferred to decision block 1017. The latter block examines the TRANS_COM message received back from the controlling communication terminals to determine if all of the requested communication types have been added. If the answer is no, block 1019 displays to the user which of the requested added communication types have actually been added to the terminal's participation in the multimedia conference call. If the answer in decision block 1017 is yes, block 1018 displays a message to the user of the communication terminal that all of the requested communication types have been added to the communication terminal's participation in the multimedia conference call.

Returning to decision block 1001, if these are messages from the controlling communication terminal, decision block 1001 transfers control to decision block 1101 of FIG. 11. Decision block 1101 determines if a disconnect message has been received from the controlling communication terminal. If the answer is yes, block 1101 drops the call. If the answer in decision block 1101 is no, decision block 1103 determines if the controlling communication terminal has sent a message that another communication terminal participating in the multimedia conference call has changed communication types or has disconnected from the communication call. The message checked for in decision block 1103 would be a notify message. If the answer in decision block 1103 is no, control is transferred to block 1105 which performs normal processing. If the answer in decision block 1103 is yes, block 1104 displays the change and identifies the communication terminal making the change to the user of the communication terminal before returning control to block 1001 of FIG. 10.

Figure 13:
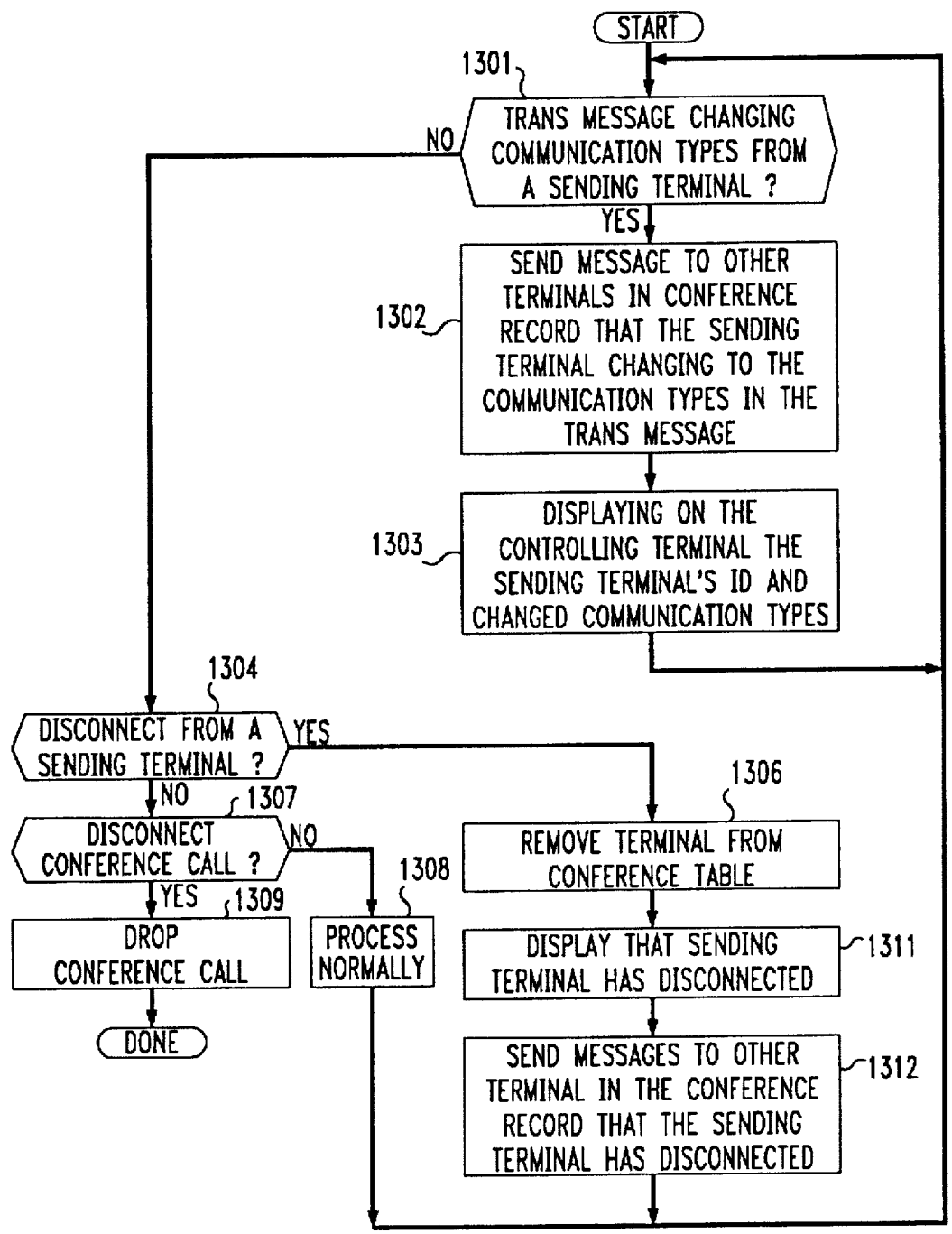
FIG. 13 illustrates, in flow chart form, operations performed by a communication terminal controlling a multimedia communication conference call.

FIG. 13 illustrates the operations performed by the communication terminal controlling the multimedia communication conference call with respect to another communication terminal participating in the multimedia communication conference call performing disconnects or changing communication types. One skilled in the art would readily envision that the controlling communication terminal performs a number of other operations with respect to the multimedia communication conference call. Decision block 1301 determines if a TRANS message has been received from a communication terminal participating in the multimedia conference call changing communication types. Note, that such a communication terminal is referred to as the sending terminal. Block 1301 also sends the TRAN_COM back to the sending terminal. If the answer is yes in decision block 1301, block 1302 sends messages to the other communication terminals that are part of the multimedia communication conference call identifying the sending communication terminal and the changes in communication types being used by the sending communication terminal. The controlling communication terminal maintains a conference record as illustrated in FIG. 12 which identifies the participating communication terminals and the communication types being utilized by each of the participating communication terminals. After execution of block 1302, block 1303 displays to the user of the controlling communication terminal the sending terminal's identification and the changed communication types.

Returning to decision block 1301, if the answer in decision block 1301 is no, decision block 1304 determines if a disconnect was received from a sending terminal. If the answer is yes, that sending terminal is removed from the conference table illustrated in FIG. 12 by execution of block 1306. There is no need to drop that sending communication terminal from the multimedia communication conference call because the disconnect message will automatically accomplish that. After execution of block 1306, block 1311 displays to the user of the controlling communication terminal the fact that the sending communication terminal had disconnected from the multimedia communication conference call, and block 1312 sends messages to the remaining communication terminals listed in the conference table informing those communication terminals that the sending communication terminal has disconnected from the multimedia communication conference call.

Returning to decision block 1304, if the answer is no, control is transferred to decision block 1307 that determines if the user of the controlling communication terminal wishes to disconnect from the multimedia communication conference call. If the answer is yes, block 1309 is executed which drops the multimedia communication conference call by transmission of disconnect messages to all of the communication terminals listed in the conference table of FIG. 12. If the answer in decision block 1307 is no, block 1308 is executed to perform normal processing. After execution of blocks 1308 or 1312, control is transferred back to block 1301.

Figure 14:
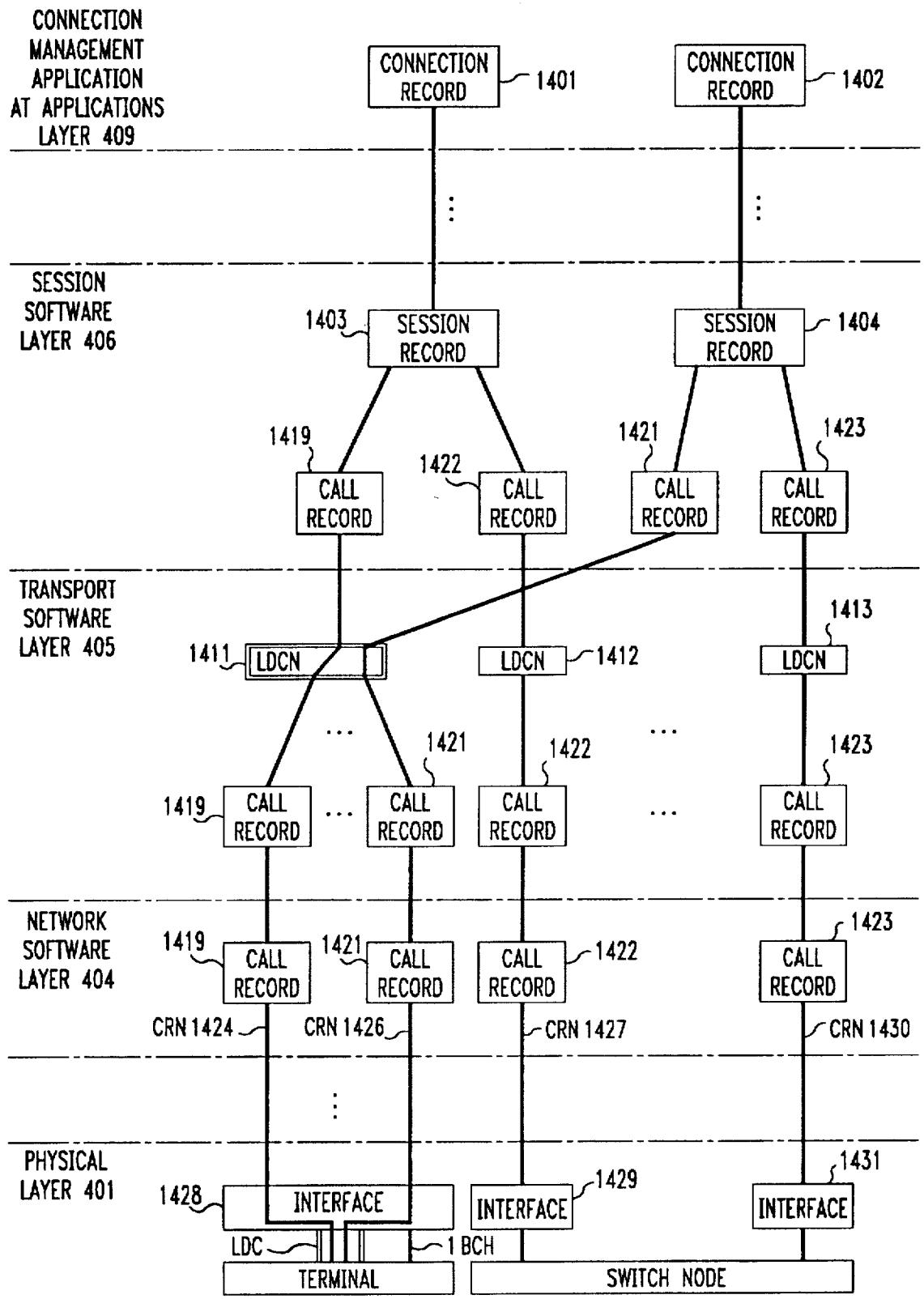
FIG. 14 illustrates the logical structure of two calls through the network, transport, session, and application software layers.

FIG. 14 illustrates the various records and logical control links for two calls terminated on terminal 101. Software layers 401 through 409 are being executed on a switch node 102 that interconnects terminal 101 to switch node 103. Interface 1428 terminates PRI link 111, and interfaces 1429 and 1431 terminate PRI links 112 and 116, respectively. As illustrated in FIG. 14, terminal 101 is engaged in two calls. One call is handled by session record 1403; while the second call is handled by session record 1404. The left half of the first call utilizes CRN 1424 and call record 1419; and the left half of the second call record 1421. The fight half of the first call terminates on interface 1429 and utilizes CRN 1427 and call record 1422. The fight half of the second call terminates on interface 1431 and utilizes CRN 1430 and call record 1423. LDCN 1411 is shared by the left halls of both calls. Connection record 1401 is used by the first call; and connection record 1402 is used by the second call.

Figure 15:
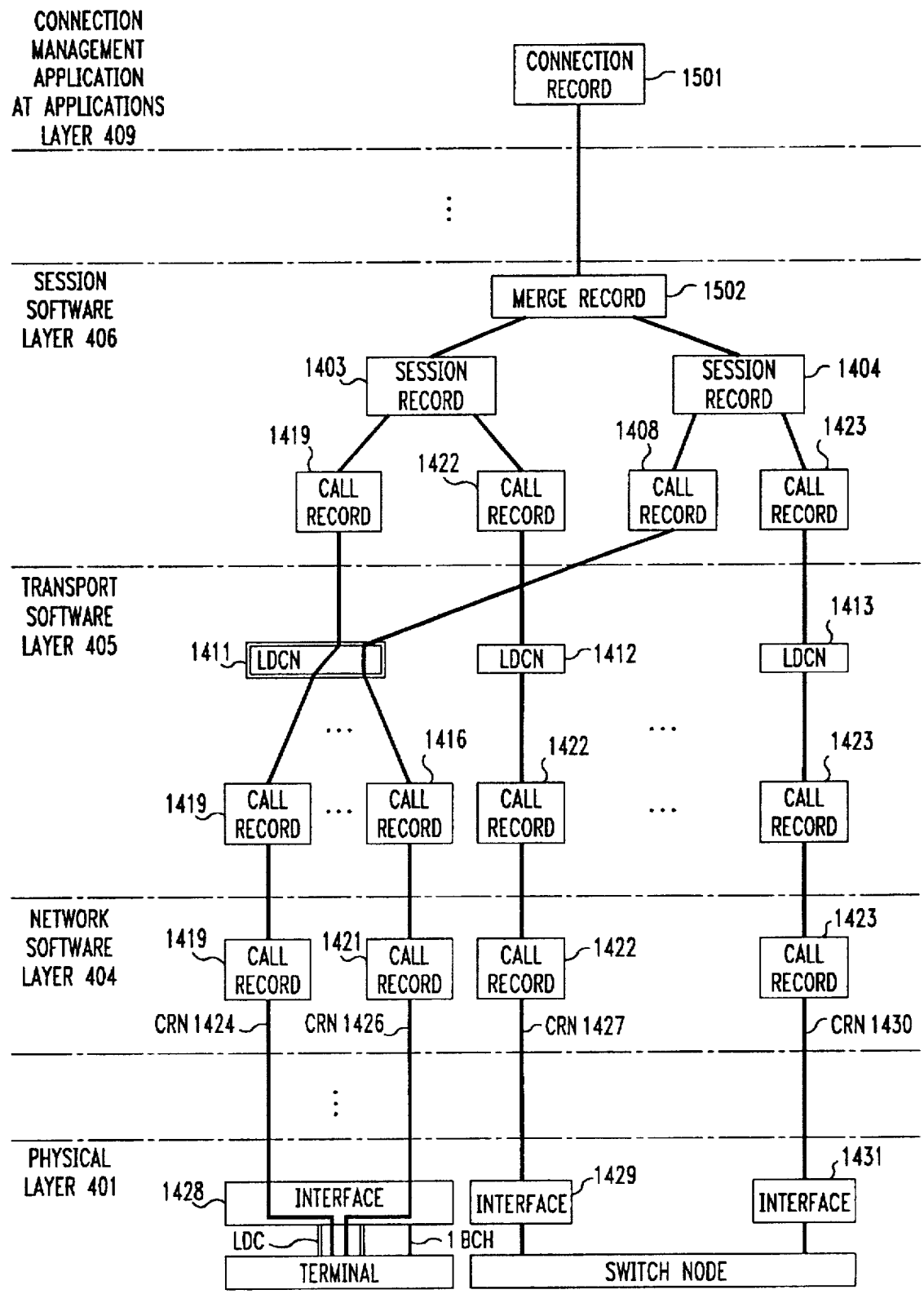
FIG. 15 illustrates the logical structure of a conference call through the network, transport, session, and application software layers.

FIG. 15 illustrates the results of a merge message being transmitted from the terminal management application of terminal 101 to switch node 102. For the sake of example, it is assumed that the merge message is transmitted as a control message on the first call; hence, it is using CRN 1424. When network software layer 404 receives the merge message, it relays the merge message to the merge software module in session software layer 406. The merge module of the latter software layer is responsive to the merge message to determine that the call to be merged is identified by CRN 1426. In addition, the merge message identifies that the call to be merged with the call of CRN 1426 is identified by CRN 1424. The merge module in session software layer 406 utilizes CRNs 1424 and 1426 to identify session records 1403 and 1404 respectively. After identifying session records 1403 and 1404, the merge module in session software layer 406 creates merge record 1502. Merge record 1502 identifies all signal transports utilized by session records 1404 and 1403 that are to be physically merged into a single conference call.

After creating merge record 1502, the merge software module of session software layer 406 requests that the connection manager at applications layer 409 combine all of the access points (call destination points) identified by connection records 1401 and 1402 of FIG. 14 into a single call record. The connection manager is responsive to this request to merge connection records 1401 and 1402 into a new connection record designated as connection record 1501. The connection manager then controls the physical network so that a conference bridge is created that combines the voice information being received via the two right halls of the first and second calls with voice information being received over a single B channel for the left halfs of the calls. Although the voice information has been combined over a single B channel to terminal 101, the control of the two calls is still transmitted to terminal 101 using CRN 1426 and CRN 1424. If the calls also used video, the connection manager would control the video network so that a video bridge was established for the conference call.

If the terminal management application of terminal 101 requests transmission of a TRANS message for the second call (which is identified by CRN 1426) to reduce the bandwidth from voice to low speed data, network software layer 404 is responsive to this TRANS message to perform the functions previously described with respect to FIG. 6. However, when a request is transmitted to the connection manager to remove the voice transport upon receipt of a TRANS_COM, the connection manager determines from connection record 1501 that the voice transport is still required for the first call. The connection manager however establishs the low speed data link that was requested by network software layer 404 in the TRANS message and acknowledged by the TRAN_COM message. The TRANS message is then transferred up to session software layer 406 and is identified by session record 1404. Session software layer 406 then transmits the TRANS message down the right half of the second call by using call record 1423 and CRN 1430. Network software layer 404 is responsive to the TRANS message being received from session software layer 406 to process this message as was previously described with respect to FIG. 6.

If the terminal management application of terminal 101 requests transmission of a TRANS message for the second call (which is identified by CRN 1426) to change the bandwidth on the second call from low speed data to voice, network software layer 404 is responsive to this TRANS message to perform the functions previously described with respect to FIG. 6. Upon receipt of a TRANS_COM message, the terminal management application requests that the connection manager add the voice transport to the call and remove the low speed data. The connection manager determines from connection record 1501 that the voice transport must be combined into the conference call that is presently taking place and controls the physical network and the conference bridge to accomplish this. In addition, the connection manager controls the lower software layers to remove the low speed data link. As before, if video transport was being added to the conference call, the connection manager also controls the video network and the video conference bridge to place the second call into the conference.

FIG. 16 illustrates a communication terminal suitable for use as communication terminals 101,104, or 106. Video screens 1607 and 1608 are intended to indicate a partitioning of display 1610 so as to allow each member of the multimedia conference to be displayed separately. As is well known in the art, there could be more video screens then two as illustrated in FIG. 16. The call state 1609 is intended to be utilized to display the various states and conditions of the multimedia conference call. In addition, the user can select the participation types and bandwidth that are displayed in this screen.

It is to be understood that the above-described embodiments are merely illustrative of the principles of the invention and that other arrangements may be devised by those skilled in the art without departing from the spirit or scope of the invention.

The invention claimed is:

1. A method for controlling participation in a multimedia conference call through a plurality of switch nodes by a telecommunication terminal via a telecommunications call path, and the multimedia conference call includes a plurality of telecommunication terminals and has a plurality of participation functions, the method comprising the steps of:

detecting an indication from a user of the telecommunication terminal to modify the number of the plurality of participation functions utilized by the telecommunication terminal;

modifying the number of the plurality of participation functions utilized by the telecommunication terminal by transmission of a message for changing the telecommunication bandwidth through out the telecommunication call path interconnecting the telecommunication terminal into the multimedia conference call whereby each of the plurality of switch nodes in the call path is responsive to that message to change the telecommunication bandwidth; and signaling completion of the modification of the number of the plurality of participation functions to the user of the telecommunication terminal.

2. The method of claim 1 wherein the step of modifying increases the number of the plurality of participation functions utilized by the telecommunication terminal.

3. The method of claim 1 wherein the step of modifying decreases the number of the plurality of participation functions utilized by the telecommunication terminal.

4. The method of claim 1 further comprises the step of recording in an internal table the modification of the number of the plurality of participation functions by the telecommunication terminal by a controlling one of the plurality of the telecommunication terminals controlling the multimedia conference call.

5. The method of claim 4 further comprises the step of transmitting the modification of the number of plurality of participation functions to remaining ones of plurality of the other telecommunication terminals by the controlling one of the plurality of the telecommunication terminals.

6. An apparatus for controlling participation in a multimedia conference call through a plurality of switch nodes by a telecommunication terminal via a telecommunication call path, and the multimedia conference call includes a plurality Of telecommunication terminals and has a plurality of participation functions, comprising:

means for detecting an indication from a user of the telecommunication terminal to modify the number of the plurality of participation functions utilized by the telecommunication terminal;

means for modifying the number of the plurality of participation functions utilized by the telecommunication terminal by transmission of a message for changing the telecommunication bandwidth through out the telecommunication call path interconnecting the telecommunication terminal into the multimedia conference call whereby each of the plurality of switch nodes in the call path is responsive to that message to change the telecommunication bandwidth; and means for signaling completion of the modification of the number of the plurality of participation functions to the user of the telecommunication terminal.

7. The apparatus of claim 6 wherein the means for modifying increases the number of the plurality of participation functions utilized by the telecommunication terminal.

8. The apparatus of claim 6 wherein the means for modifying decreases the number of the plurality of participation functions utilized by the telecommunication terminal.

9. The apparatus of claim 6 further comprises means in the controlling one of the plurality of the telecommunication terminals controlling the multimedia conference call for recording in an internal table the modification of the number of the plurality of participation functions.

10. The apparatus of claim 9 further comprises means in a controlling one of the plurality of the telecommunication terminals for transmitting the modification of the number of plurality of participation functions to remaining ones of plurality of the other telecommunication terminals.

* * * * *